United States Patent Office 2,907,765
Patented Oct. 6, 1959

2,907,765
PIPERAZINE DERIVATIVES

Arthur W. Weston, Waukegan Township, Lake County, Ill., assignor to Abbott Laboratories, Chicago, Ill., a corporation of Illinois No Drawing. Original application November 12, 1954, Serial No. 468,547. Divided and this application September 10, 1956, Serial No. 608,659

5 Claims. (Cl. 260—268)

The present invention relates to a di-substituted piperazine compound having improved therapeutic properties and more particularly to novel di-substituted hydroxyalkyl piperazine compounds and to the method of making said compounds.

The novel substituted piperazine base of the present invention has the general formula:

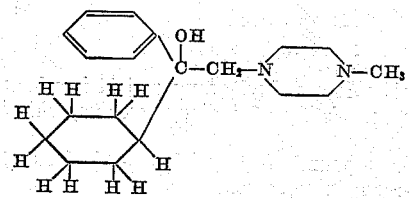

The following specific examples are for the purpose of illustrating the present invention and should not be considered as limiting the said invention to the particular ingredients or proportions disclosed.

EXAMPLE I

N-(β-cyclohexyl-β-hydroxy-β-phenyl-ethyl)N'-methylpiperazine

In a 2-liter, 3-necked, round-bottomed flask equipped with a stirrer, dropping funnel, and a condenser protected with a calcium chloride drying tube is placed 13.7 g. (.57 mol) of magnesium turnings and the magnesium is covered with 200 cc. of anhydrous ether. A crystal of iodine is added to the flask and 92.9 g. (.57 mol) of cyclohexyl bromide dissolved in 300 cc. of anhydrous ether is added dropwise with stirring while the reaction proceeds. After the addition of the cyclohexyl bromide is completed, the resulting mixture is stirred and heated on a steam bath for 3 hours. The mixture is cooled to room temperature and 49.5 g. (.227 mol) of N-phenacyl-N'-methylpiperazine dissolved in 500 cc. of anhydrous ether is added dropwise and the resulting mixture is stirred and refluxed for about 16 hours. The reaction mixture is cooled and 50 g. of ammonium chloride dissolved in 200 cc. of water is added dropwise thereto with stirring. The decomposed Grignard complex is then filtered. Benzene is added to the ether filtrate and the solvents are removed therefrom on a steam bath. The residue is fractionated and the base, N-(β-cyclohexyl-β-hydroxy-β-phenyl-ethyl)N'-methylpiperazine, is obtained as a liquid having a boiling point of 196–203° C. at a pressure of 4.0 mm. and a reactive index $n_D^{25}$ of 1.5372. On chemical analysis the base obtained has 75.16% C, 9.76% H, as compared with a theoretical analysis of 75.45% C, 10.00% H.

EXAMPLE II

N-(β-cyclohexyl-β-hydroxy-β-phenyl-ethyl)N'-methylpiperazine dihydrochloride hemihydrate One gram of the base as obtained in Example I is dissolved in approximately 15 cc. of ethyl alcohol and an excess of an ethanolhydrogen chloride solution is added. The dihydrochloride salt of the base crystallizes on cooling and the salt has a melting point of 235–236° C. On chemical analysis the N-(β-cyclohexyl-β-hydroxy-β-phenyl-ethyl)N'-methylpiperazine dihydrochloride hemihydrate is found to have 59.12% C, 8.38% H, 7.56% N as compared with a theoretical analysis of 59.37% C, 8.65% H, 7.29% N.

EXAMPLE III

N-(β-cyclohexyl-β-hydroxy-β-phenyl-ethyl)N'-methylpiperazine methiodide

To 3.0 g. of the base obtained in Example I dissolved in anhydrous ether is added 1.4 g. of methyl iodide. The mixture is allowed to stand at room temperature for approximately 48 hours. The crystalline precipitate formed is filtered and recrystallized twice from ethyl alcohol to yield the methyl iodide quaternary salt of N-(β-cyclohexyl-β-hydroxy-β-phenyl-ethyl)-N'-methylpiperazine having a melting point of 202–203° C. On chemical analysis the quaternary ammonium salt is found to have 54.05% C, 7.48% H, 6.31% N as compared with a theoretical analysis of 53.92% C, 7.30% H, 6.04% N.

EXAMPLE IV

N-(β-cyclohexyl-β-hydroxy-β-phenyl-ethyl)N'-methylpiperazine methosulfate

To 3.8 g. of the base obtained in Example I dissolved in 35 cc. of ethyl alcohol is added 1.6 g. of dimethyl sulfate. The solution is allowed to stand at room temperature for about 12 hours. The salt formed is filtered, recrystallized from ethyl alcohol, and is found to have a melting point of 203–204° C. On chemical analysis the methosulfate quaternary ammonium salt is found to have 58.85% C, 8.47% H, 6.56% N as compared with a theoretical analysis of 59.04% C, 8.66% H, 6.75% N.

EXAMPLE V

N-phenacyl-N'-methylpiperazine

A solution of 80 g. of N-methylpiperazine dissolved in 250 cc. of anhydrous xylene is added to 42.4 g. of anhydrous sodium carbonate in a 1-liter, 3-necked, round-bottomed flask equipped with a stirrer, dropping funnel, and condenser protected with a calcium chloride drying tube. While the mixture is being stirred and refluxed a suspension of 79.6 g. of phenacyl bromide dissolved in 100 cc. of anhydrous xylene is added dropwise. The mixture is stirred and refluxed for about 16 hours. The cooled reaction mixture is extracted 3 times with dilute hydrochloric acid and the acidic extractions are made alkaline with dilute sodium hydroxide solution. The oil layer is separated, concentrated, and water is removed therefrom by the addition of benzene. The semi-solid residue is fractionated to yield a solid which on recrystallizing from Skellysolve B has a melting point of 69–70° C. On analysis the product N-phenacyl-N'-methylpiperazine is found to have a nitrogen content of 12.68% as compared with a theoretical nitrogen content of 12.84%.

The dihydrochloride salt of the base is prepared by treating the said base with ether-hydrogen chloride to precipitate the dihydrochloride salt of the base and upon recrystallizing twice from methanol yields a salt having a melting point of 250–251° C. On analysis the dihydrochloride salt of N-phenacyl-N'-methylpiperazine is found to have a nitrogen content of 9.58% as compared with a theoretical nitrogen composition of 9.62%.

As an alternate method of producing N-phenacyl-N'-methylpiperazine, a solution of 99.5 g. of phenacyl bromide dissolved in 150 cc. of anhydrous xylene is added dropwise with stirring to a heated mixture of 60 g. of N-methylpiperazine and 60.6 g. of triethylamine in 150 cc. of anhydrous xylene. The mixture is stirred and refluxed for about 16 hours. The cooled reaction mixture is filtered to remove triethylamine hydrobromide salt. The xylene solution is extracted several times with dilute hydrochloric acid and the acedic extractions are made strongly alkaline with 40% sodium hydroxide solution. The base is extracted several times with ether and the ether solutions are concentrated on a steam bath to which benzene is added to remove water. The residue is fractionated to yield N-phenacyl-N'-methylpiperazine having a boiling point of 156–157° C. at a pressure of 3.5 mm. and which solidifies to a crystalline solid having a melting point of 60–62° C.

Other quaternary ammonium derivatives of the novel base of the present invention can be readily prepared by treating the base with methyl bromide, methyl p-toluenesulfonate, benzyl bromide, ethyl chloride, or other known quaternizing agent in accordance with any of the usual methods.

The quaternary ammonium salts of the novel base of the present invention are useful as antispasmodic drugs and can be administered in the form of 100 mg., 200 mg., and 300 mg. tablets as prescribed by a physician.

The compositions of the present invention are generally more conveniently administered therapeutically as non-toxic salts, including the acid addition salts and the quaternary ammonium salts, since these salts are usually more soluble in water than is the free base. Any acid which produces a water-soluble salt and does not appreciably enhance the toxicity is suitable for use, and such acids as sulfuric, phosphoric, hydrochloric, levulinc, mucic, acetic and tartaric acid can be used. The sparingly soluble salts, as well as the free bases, however, can be administered when the pharmacological effect desired should be slow and relatively long in duration.

The present application is a divisional application of the inventor's copending application, Serial No. 468,547, filed November 12, 1954, now abandoned.

Others may readily adapt the invention for use under various conditions of service by employing one or more of the novel features disclosed or equivalents thereof. As at present advised with respect to the apparent scope of my invention, I desire to claim the following subject matter.

I claim:

1. A chemical compound selected from the group consisting of the base having the formula:

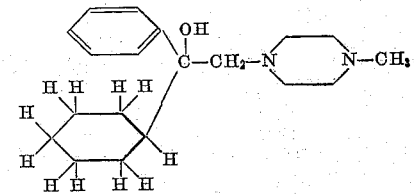

and the non-toxic acid addition and non-toxic quaternary ammonium salts of said base, said quaternary salts having the general formula:

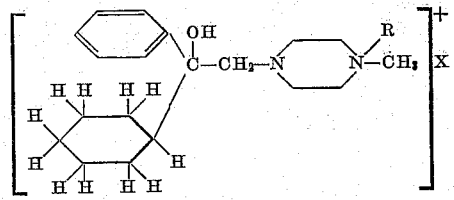

where R is a lower alkyl group and X is selected from the group consisting of iodine, bromine, chlorine and sulfate.

2. The compound N-(β-cyclohexyl-β-hydroxy-β-phenylethyl)N'-methylpiperazine.

3. The compound N-(β-cyclohexyl-β-hydroxy-β-phenylethyl)N'-methylpiperazine dihydrochloride.

4. The compound N-(β-cyclohexyl-β-hydroxy-β-phenylethyl)N'-methylpiperazine methiodide.

5. The compound N-(β-cyclohexyl-β-hydroxy-β-phenylethyl)N'-methylpiperazine methosulfate.

References Cited in the file of this patent

UNITED STATES PATENTS

| | | |
|---|---|---|
| 2,680,115 | Ruddy | June 1, 1954 |
| 2,716,121 | Denton | Aug. 23, 1955 |